(12) United States Patent
Moskalik et al.

(10) Patent No.: US 6,837,519 B2
(45) Date of Patent: Jan. 4, 2005

(54) SEAT BELT LATCH PLATE AND METHOD OF MAKING SAME

(75) Inventors: Michael P. Moskalik, Grand Blanc, MI (US); Paul M. Van Rooyen, Orion, MI (US); Gary J. Griffin, Fraser, MI (US)

(73) Assignees: General Motors Corporation, Detroit, MI (US); U.S. Farathane Corporation, Royal Oak, MI (US)

( * ) Notice: Subject to any disclaimer, the term of this patent is extended or adjusted under 35 U.S.C. 154(b) by 41 days.

(21) Appl. No.: 10/178,001

(22) Filed: Jun. 21, 2002

(65) Prior Publication Data

US 2003/0234530 A1 Dec. 25, 2003

(51) Int. Cl.[7] .............................................. B60R 22/00
(52) U.S. Cl. ................................................... 280/801.1
(58) Field of Search ......................... 24/265 BC, 163 R, 24/197; 280/801.1, 808, 743.1, 801.2, 748, 751

(56) References Cited

U.S. PATENT DOCUMENTS

| | | | | |
|---|---|---|---|---|
| 3,770,919 A | * | 11/1973 | Lewis | |
| 4,062,091 A | | 12/1977 | Holmberg | 24/230 R |
| 4,064,603 A | | 12/1977 | Romanzi, Jr. | 24/230 A |
| 4,133,556 A | * | 1/1979 | Glinski | |
| 4,141,573 A | * | 2/1979 | Ellens | |
| 4,157,841 A | * | 6/1979 | Bergman et al. | |
| 4,220,354 A | * | 9/1980 | Cataldo | |
| 4,310,177 A | * | 1/1982 | Rogers, Jr. et al. | |
| 4,588,207 A | * | 5/1986 | Doty | |
| 4,606,552 A | * | 8/1986 | Hultqvist | |
| 4,993,746 A | * | 2/1991 | Hagelthorn | |
| 5,100,176 A | * | 3/1992 | Ball et al. | |
| 5,139,282 A | * | 8/1992 | Mein | |
| 5,215,332 A | * | 6/1993 | De Sloovere | |
| 5,286,057 A | * | 2/1994 | Forster | |
| 5,415,433 A | * | 5/1995 | Pfeiffer | |
| 5,601,311 A | * | 2/1997 | Pfeiffer et al. | |
| 5,984,358 A | * | 11/1999 | Mar et al. | |
| 6,113,146 A | * | 9/2000 | Mautsch et al. | |
| 6,142,525 A | * | 11/2000 | Boelstler | |
| 6,168,206 B1 | * | 1/2001 | Greib et al. | |
| 6,217,070 B1 | * | 4/2001 | Kopetzky | |
| 6,302,477 B1 | * | 10/2001 | Satou | |
| 6,526,630 B2 | * | 3/2003 | Suzuki et al. | |
| 6,533,322 B2 | * | 3/2003 | Janz | |
| 6,550,103 B2 | * | 4/2003 | Koops et al. | |

* cited by examiner

*Primary Examiner*—Thomas Price
(74) *Attorney, Agent, or Firm*—Laura C. Hargitt

(57) ABSTRACT

An improved latch plate for a seat belt attached to a vehicle C-pillar. The latch plate is produced from a plated metal stamping that has a portion over molded with a hard polypropylene coating. This portion has a slot for pass through of the seat belt webbing that allows free travel of the latch plate in order for the seat occupant to fasten and wear the belt. A surround of soft Santoprene® 221–55 is over molded over the polypropylene coating for sound reduction.

8 Claims, 4 Drawing Sheets

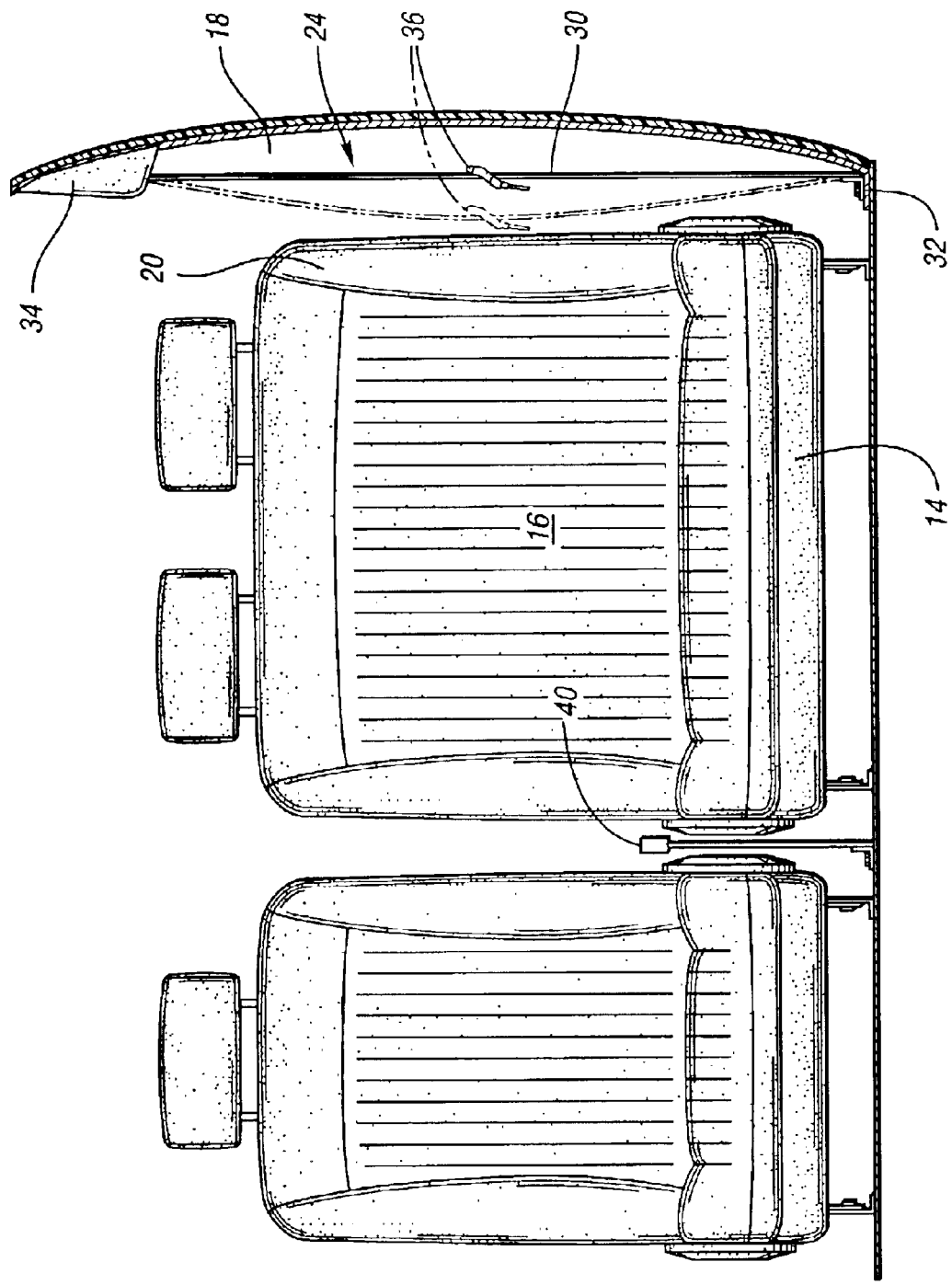

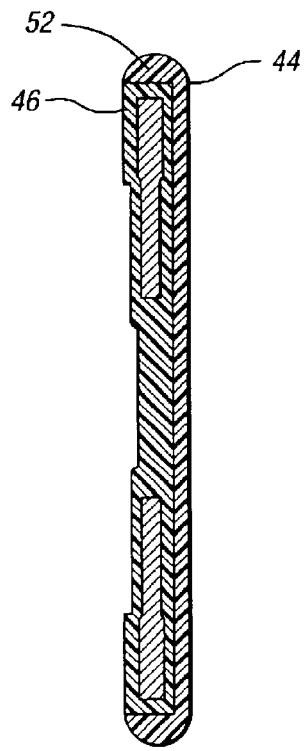
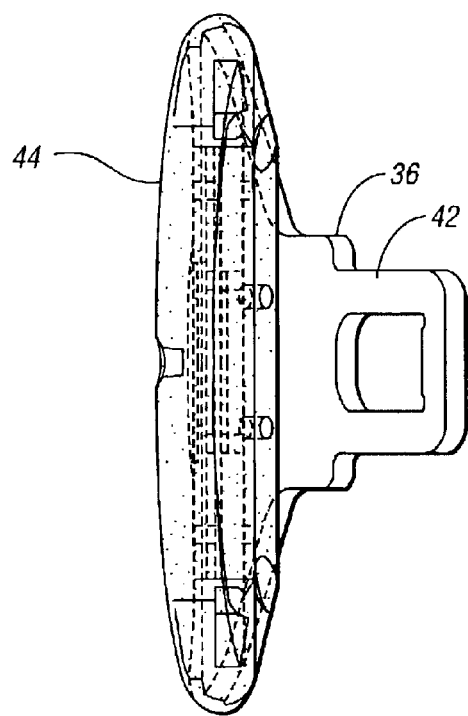
*Fig. 4*  *Fig. 5*
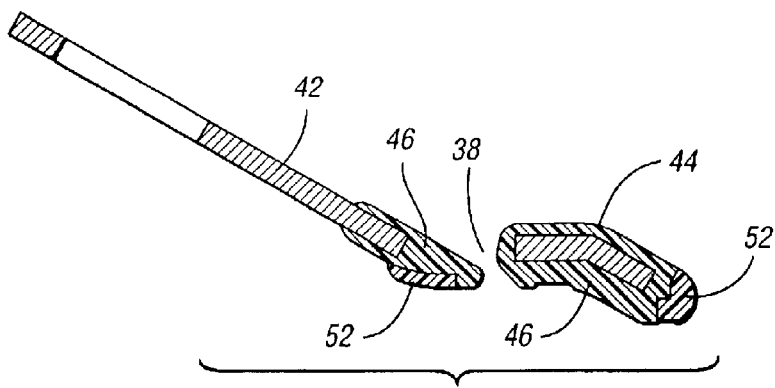
*Fig. 6*
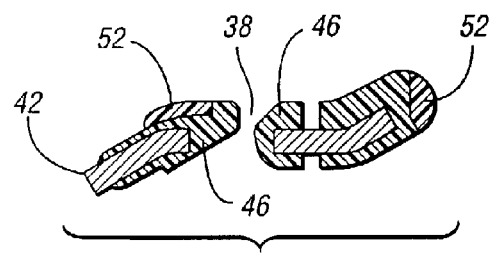
*Fig. 7*

SEAT BELT LATCH PLATE AND METHOD OF MAKING SAME

BACKGROUND OF THE INVENTION

1. Field of the Invention

This invention relates to a slotted latch plate on the webbing of a vehicle seat belt.

2. Description of the Related Art

Automotive vehicles have a seat belt system to protect the driver and passenger. The seat belt in such systems is generally webbing which may be drawn across the lap and chest and latched as a restraint for the driver and passenger. A latch plate moves freely along the webbing and has a polypropylene coating to protect the webbing where it goes through a slot in the latch plate and for cosmetic or appearance reasons. One seat belt location is the rear seat alongside the C-pillar of the vehicle. When there is no passenger in this seat, the webbing of the seat belt system lays idle alongside the C-pillar.

Under certain road conditions, vibration or movement of the seatback and/or vehicle vibrations may shake the latch plate and/or the latch plate may swing (like a pendulum) and contact the C-pillar trim. Accordingly, the latch plate may shake as the vehicle moves. If the latch plate is next to the vehicle trim at the C-pillar, this shaking may cause undesirable rattle or noise. Prior attempts to solve this problem include plastic clips attached to the trim for stowing the latch plate.

SUMMARY OF THE INVENTION

An object of the invention is an improved method for perimeter over molding of soft material onto a polypropylene coated seat belt latch plate for sound reduction. An improved seat belt latch plate is made by the method for a vehicle seat belt system.

The seat belt latch plate is produced from a plated metal stamping that has a portion of it over molded with a polypropylene coating. This portion has a slot for pass-through of the seat belt webbing. The slot allows the free travel of the latch plate as the seat occupant draws the latch plate along the webbing to fasten and wear the seat belt.

A strip of Santoprene® 221–55 (relatively soft) is over molded on the polypropylene (relatively hard) along the perimeter of the latch plate for sound reduction.

Accordingly, the invention is a slotted latch plate for a vehicle seat belt system which has webbing extending through the slot as the latch plate is moved by the seat back in potentially noise-making respect to the C-pillar trim. The latch plate has a relatively hard plastic coating over molded on the latch plate where the latch plate slot receives the webbing. The latch plate also has a relatively soft plastic surround over molded on at least a portion of the relatively hard plastic coating in cooperation therewith and sufficiently thick that any noise made by the latch plate imparted by movement of the seatback and/or vehicle vibrations is reduced.

The invention is also a method of making a potentially noise-proof latch plate for a vehicle seat belt system. The method provides a plated steel stamping. A relatively warm coating of a relatively hard plastic is injection molded onto the exterior of the stamping. Then, a relatively soft plastic is injection molded onto selected portions of the relatively hard plastic while the hard plastic coating is still warm and to a sufficient thickness that any rattle noise potentially made by the latch plate is reduced.

BRIEF DESCRIPTION OF THE DRAWINGS

FIG. 1c is an elevational view looking rearwardly in the vehicle to show a latch plate and seat belt positioned alongside the C-pillar trim and the seat;

FIG. 4 is a cross-section of the latch plate taken along line 4—4 of FIG. 3;

FIG. 5 is a top elevational view of the latch plate from the latch end thereof;

FIG. 6 is a cross-section of the latch plate taken along line 6—6 of FIG. 3; and FIG. 7 is a cross-section of the latch plate taken along line 7—7 of FIG. 3.

DETAILED DESCRIPTION OF THE INVENTION

Figure 1A:
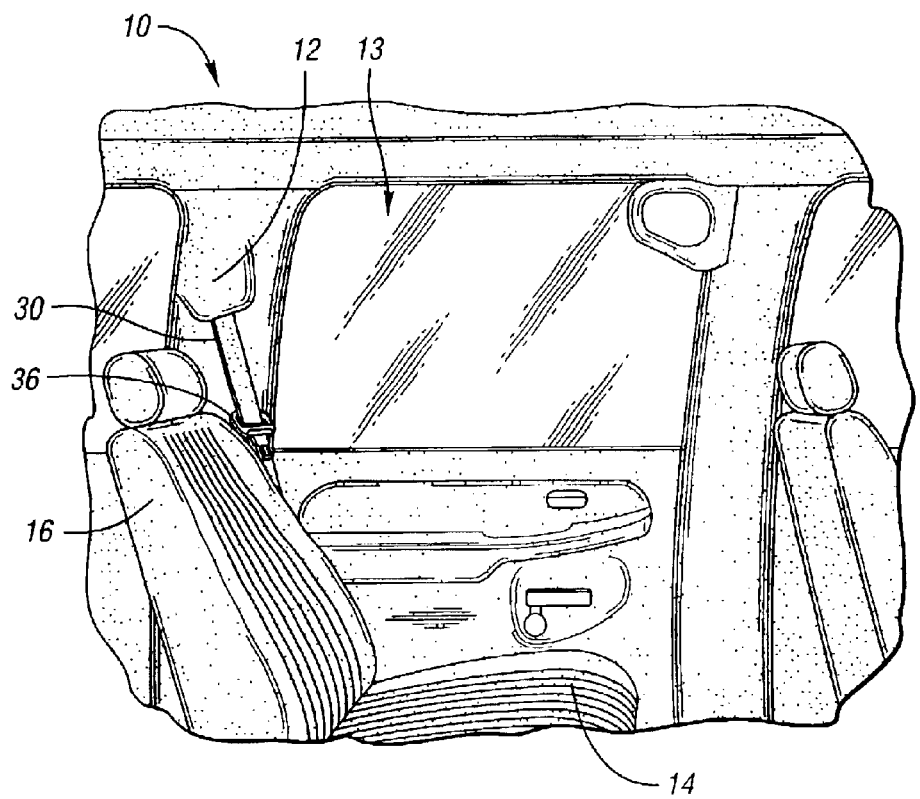
FIG. 1a is a fragmentary elevational view of a left-hand, second row upright rear passenger seat and seat belt alongside the C-pillar body portion of an automotive vehicle.
Figure 1B:
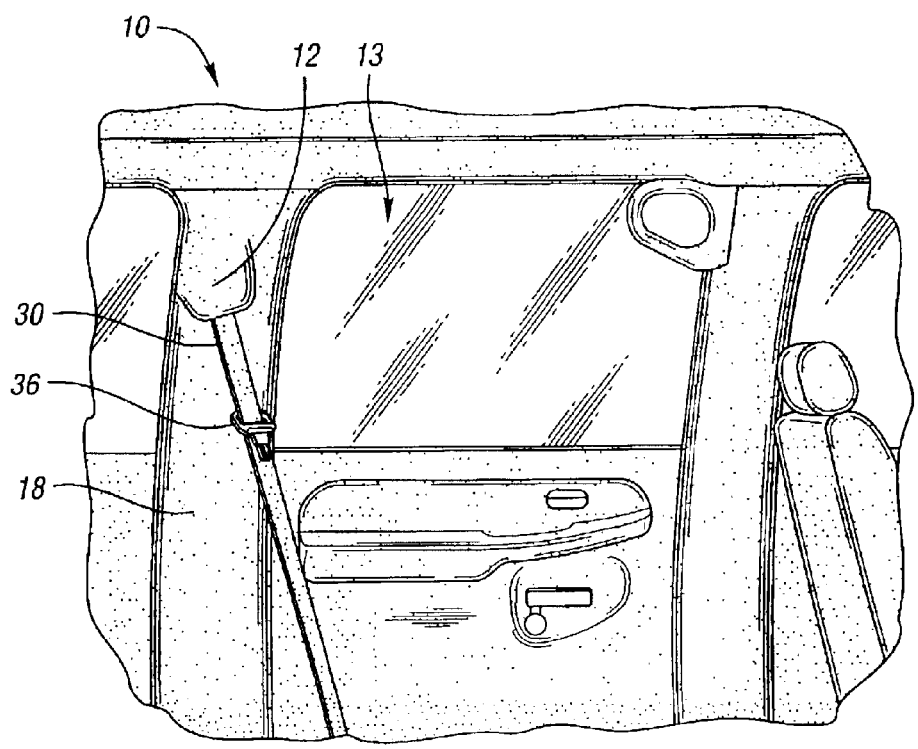
FIG. 1b is a view similar to FIG. 1a with the seat removed for clarity.
Figure 2:
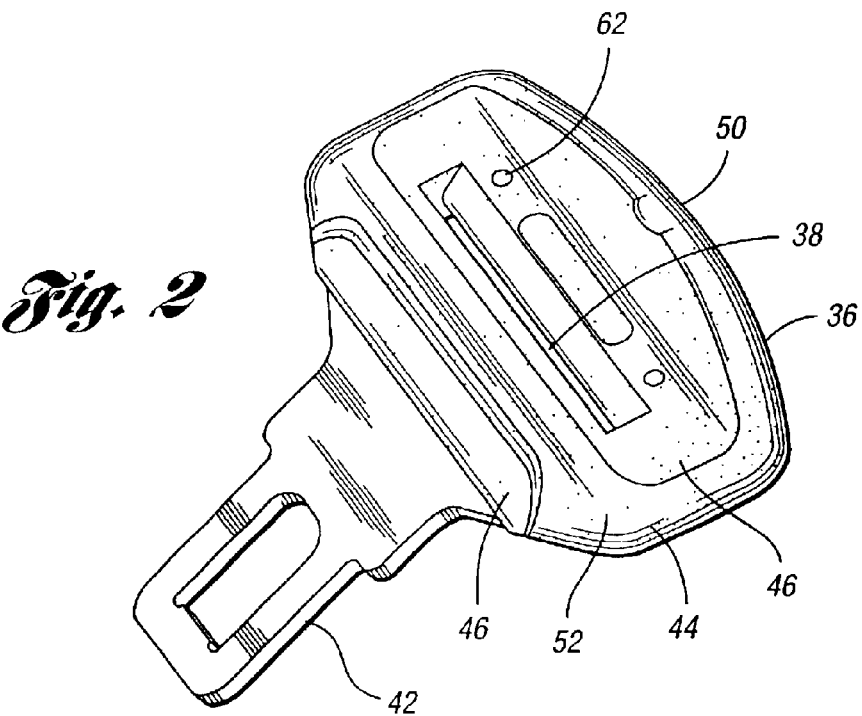
FIG. 2 is a perspective front view of the latch plate for use on the seat belt of FIGS. 1a, 1b and 1c.
Figure 3:
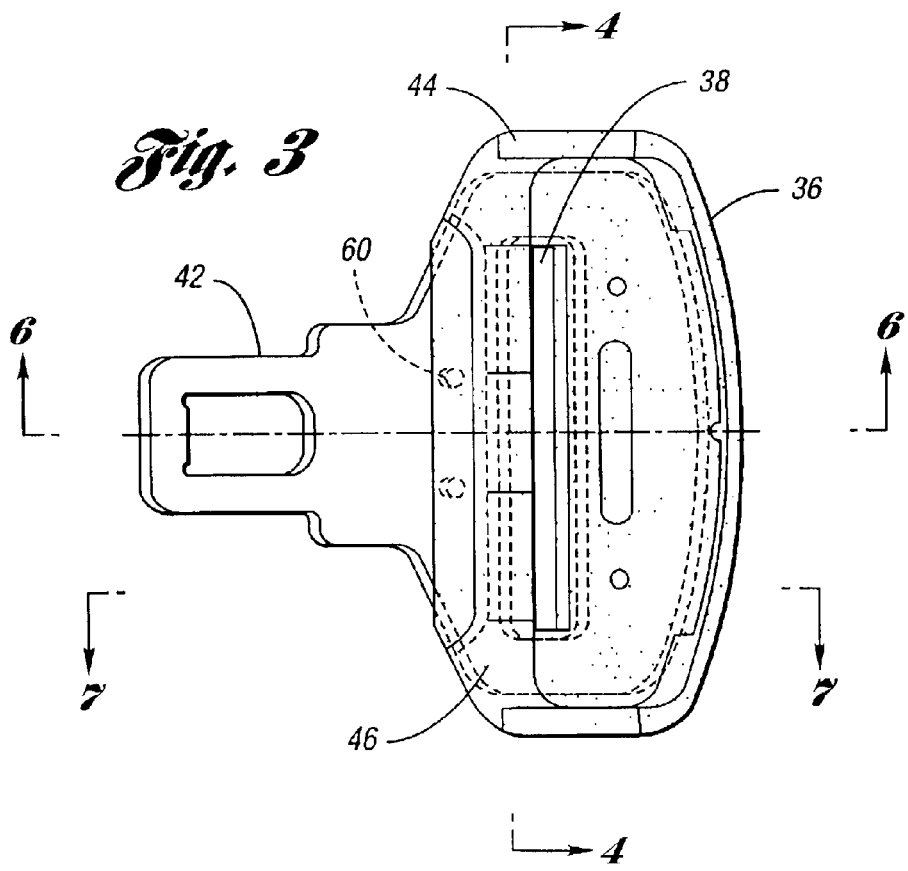
FIG. 3 is a perspective rear view of the latch plate shown in FIG. 2.

FIGS. 1a–c show an automotive vehicle 10 having a structural C-pillar portion 12 at the left rear quarter of the vehicle. The vehicle door 13 is substantially alongside a rear passenger seat 14 and seat back 16 having a seat back bolster 20. The door 13 is flanked on one side by a relatively hard polypropylene C-pillar trim panel 18. The right side of the rear seat at the C-pillar is essentially the mirror image of the left.

Vehicle 10 has a passenger safety seat belt system 24 for the left side passenger seat 14, 16. A similar seat belt system (not shown) is provided for the seat on the right side of the vehicle. The seat belt system includes a webbing 30 anchored at 32 to the vehicle body and is biasingly retracted into a retractor 34 as shown in FIG. 1c. The webbing is free to move inboard (FIG. 1c, phantom line) and outboard (FIG. 1c, solid line) at the C-pillar, restrained only by the bias of retractor 34. The webbing freely supports a latch plate 36 formed of a plated metal stamping which is slotted at 38 to receive the webbing 30. The latch plate 36 can freely slide along the webbing as the passenger belts himself or herself into the safety belt system. The latch plate is latched into a latch keeper 40 at the opposite side of seat 14.

The webbing 30 extends alongside the bolster 20 and C-pillar trim panel 18 when seat 14 is unoccupied and the latch plate 36 is unlatched. Under certain road conditions, movement of the seatback may shake the latch plate and/or the latch plate may swing (like a pendulum) and contact the C-pillar trim panel. Rattle or noise thus imparted by such seatback movement or latch plate swing may emanate from the contact of the latch plate 36 of the seat belt with the bolster 20 and the hard polypropylene trim 18 on the C-pillar 12. The latch plate embodiment of this invention solves the noise problem by reducing or masking the rattle brought on by the contact of the latch plate to the vehicle interior.

In accordance with FIGS. 2–7 of the invention, the latch plate 36 is a metal such as steel and includes the slot 38, a latch bolt portion 42 and a grip portion 44. The steel grip portion 44 is over molded with a polypropylene coating 46 (FIG. 4) to protect the webbing 30 as it passes through the slot 38. Polypropylene can also be color coordinated with the vehicle's interior as an appearance finish. Polypropylene is relatively hard as is the steel metal of the latch plate stamping.

Around the perimeter 50 of the latch plate grip portion 44 is a strip 52 of a relatively soft Santoprene® 221–55 which adheres to the polypropylene coating. Any composition that will stick or adhere to the polypropylene coating and has a Shore A durometer rating in the range of approximately 52–58 may also be suitable. Thus, a relatively soft plastic surround forms the strip 52 and is over molded on at least a portion of the relatively hard polypropylene plastic coating. The relatively soft plastic cooperates with the relatively hard plastic and is sufficiently thick (about ⅛ inch) reducing any contact noise made by the latch plate as it moves along or with respect to the webbing and/or in relation to the seat back trim.

The latch plate 36 is made in two injection molding steps. In the first step, the polypropylene grabs the flat exterior of the latch plate stamping as a relatively hard plastic coating. Some holes 60 and 62 in the stamping may facilitate this step. In the second step and while the polypropylene is still warm, just enough soft plastic, such as Santoprene® 221–55, is shot onto the polypropylene at the perimeter of the latch plate grip portion to cover and adhere to the polypropylene at the perimeter as a relatively soft plastic surround.

In sum, the first coating of relatively hard plastic polypropylene on the latch plate stamping protects the webbing from excessive wear by the latch plate stamping as the webbing passes through the latch plate slot. In the second step, the over mold covering of relatively soft plastic (Santoprene®) muffles any rattles between the latch plate and the C-pillar trim for sound reduction. Thus, the invention adds to the world-class of the vehicle and eliminates the need to have a plastic clip attached to the trim for stowing the seat belt latch plate to prevent rattle noise.

While an embodiment of the invention has been illustrated and described, it is not intended that this embodiment illustrates and describes all possible forms of the invention. Rather, the words used in the specification are words of description rather than limitation, and it is understood that various changes may be made without departing from the spirit and scope of the invention.

What is claimed is:

1. A slotted latch plate for a vehicle seat belt system having a webbing extending through the slot as the latch plate is moved by vibrations of the seat back and/or vehicle vibrations in potentially noise-making respect to the C-pillar trim, the latch plate comprising:

a relatively hard plastic coating over molded on the latch plate where the latch plate slot receives the webbing; and a relatively soft plastic surround over molded on at least a portion of the relatively hard plastic coating in cooperation therewith and sufficiently thick that any noise made by the latch plate imparted by movement of the seat back and/or vehicle vibrations is reduced.

2. The slotted latch plate of claim 1 wherein the hard plastic coating is polypropylene.

3. The slotted latch plate of claim 2 wherein the soft plastic surround is relatively soft moldable plastic.

4. The slotted latch plate of claim 2 wherein the soft plastic surround has a Shore A durometer rating in a range of 52 to 58.

5. The latch plate of claim 1 in combination with the C-pillar of a vehicle and the seat belt webbing and movable relative to the seat belt webbing along the C-pillar.

6. The latch plate of claim 1 including a latch portion and a grip portion and wherein the over mold of the soft plastic surround is on the perimeter of the grip portion of the latch plate.

7. A method of making a potentially noise-proof latch plate for a vehicle seat belt system comprising:

providing a plated steel stamping;

injection molding a relatively warm coating of a relatively hard plastic onto the exterior of the stamping; and injection molding a relatively soft plastic onto selected portions of the relatively hard plastic while the hard plastic coating is still warm and to a sufficient thickness that rattle noise made by the latch plate is reduced.

8. A slotted latch plate for a vehicle seat belt system having a webbing extending through the slot as the latch plate is moved by vibrations of the seat back and/or vehicle vibrations in potentially noise-making respect to the C-pillar trim, the latch plate comprising:

a relatively hard polypropylene plastic coating over molded on the latch plate where the latch plate slot receives the webbing;

a relatively soft moldable plastic surround over molded on at least a portion of the relatively hard plastic coating in cooperation therewith and sufficiently thick that any noise made by the latch plate imparted by movement of the seat back and/or vehicle vibrations is reduced; and a latch portion and a grip portion and wherein the over mold of the soft plastic surround is on the perimeter of the grip portion of the latch plate.

* * * * *